(12) United States Patent
Song et al.

(10) Patent No.: US 6,552,754 B1
(45) Date of Patent: Apr. 22, 2003

(54) LASER VIDEO PROJECTOR USING OPTICAL PUMPING VALVE

(75) Inventors: Chung Dam Song, Suwon (KR); Sang Mook Kim, Suwon (KR)

(73) Assignee: Samsung Display Devices Co., Ltd., Kyungki-Do (KR)

( * ) Notice: Subject to any disclaimer, the term of this patent is extended or adjusted under 35 U.S.C. 154(b) by 0 days.

(21) Appl. No.: 09/457,583

(22) Filed: Dec. 9, 1999

(30) Foreign Application Priority Data

Dec. 10, 1998 (KR) ............................................ 98-54197
Apr. 9, 1999 (KR) ............................................ 99-12507

(51) Int. Cl.[7] .............................. H04N 9/31; H04N 5/74
(52) U.S. Cl. ..................... 348/750; 348/756; 353/31; 353/81
(58) Field of Search ................... 348/744, 750, 348/756, 757, 759, 766, 195, 196, 199, 201; 352/198; 353/31, 30, 34, 37, 48, 50, 81; H04N 5/74, 9/31

(56) References Cited

U.S. PATENT DOCUMENTS 5,124,545 A * 6/1992 Takanashi et al. ..... 250/214 LA
5,517,263 A * 5/1996 Minich et al. ............... 348/771
5,526,063 A * 6/1996 Joubert et al. .............. 348/744

FOREIGN PATENT DOCUMENTS

JP 09083048 3/1997
JP 9-163393 6/1997

* cited by examiner

Primary Examiner—Michael H. Lee (57) ABSTRACT

A laser video projector using an optical pumping valve is provided. The video projector according to the present invention forms an image using an optical pumping valve including a laser resonator for resonating light of a certain wavelength, an optical pumping source for performing pumping so that the laser resonator can generate a laser beam, and an optical valve for filtering the laser beam emitted from the laser resonator so that the filtered laser beam forms a picture instead of a cathode ray tube (CRT).

28 Claims, 13 Drawing Sheets

LASER VIDEO PROJECTOR USING OPTICAL PUMPING VALVE

BACKGROUND OF THE INVENTION

1. Field of the Invention

The present invention relates to a laser projector using an optical pumping valve.

2. Description of the Related Art

Figure 1:
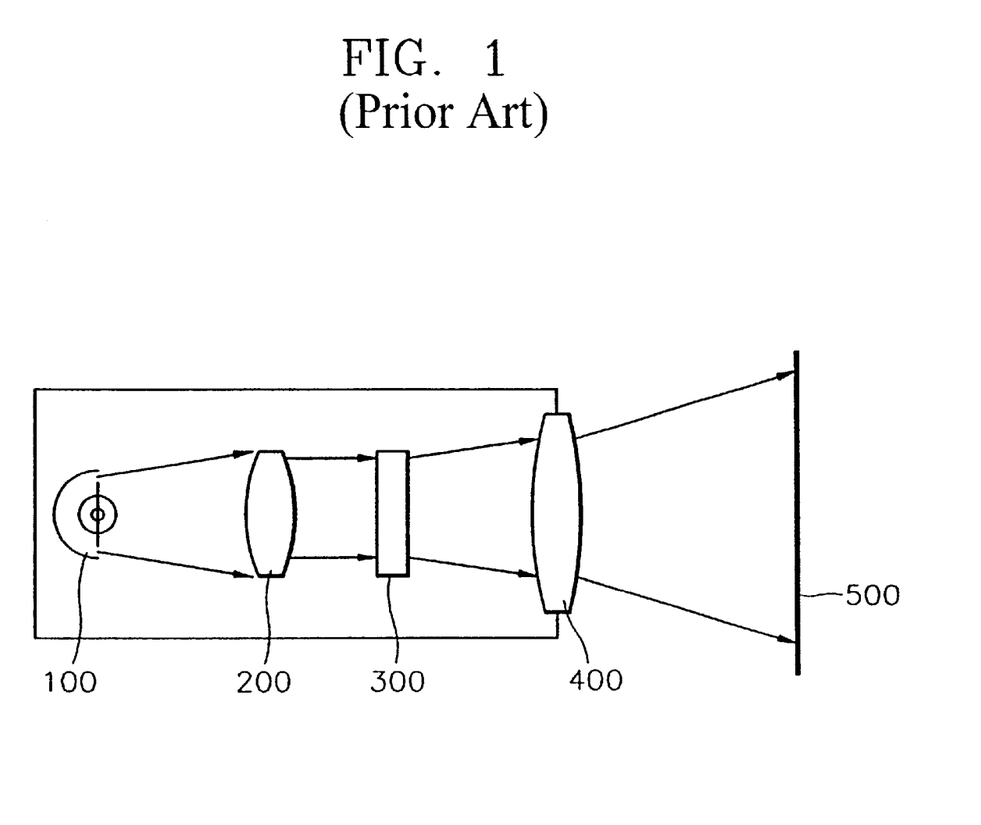
FIG. 1 shows the schematic structure of a three-dimensional video projector using a conventional liquid crystal optical valve.

FIG. 1 shows the schematic structure of a three-dimensional video projector using a conventional liquid crystal light valve (LCLV). As shown in FIG. 1, a conventional three-dimensional video projector makes white light emitted from a high voltage metal-halide lamp 100 parallel by a collimating lens 200 and collects the parallel light at a liquid crystal display panel 300. The liquid crystal display panel 300 filters incident light according to a video signal and transmits the filtered light. The transmitted light is collected at an optical lens 400 and is projected to a screen 500. Accordingly, a video screen is obtained. However, the metal-halide light of a high voltage is used in the conventional three-dimensional video projector using a conventional liquid crystal optical valve. The light which is filtered by the liquid crystal display panel and is projected has a large dispersion angle and low brightness. Accordingly, an image focused on a screen has low contrast.

In general, there are two types of video projector using a CRT. One is a single tube type in which the picture of a projection tube is enlarged by transmitting the picture through a lens. The other is a three-tube type in which the respective pictures of red, green, and blue independent projection tubes are projected to a projection screen, thus combining the pictures in the projection screen. Accordingly, a color picture is obtained.

Figure 2:
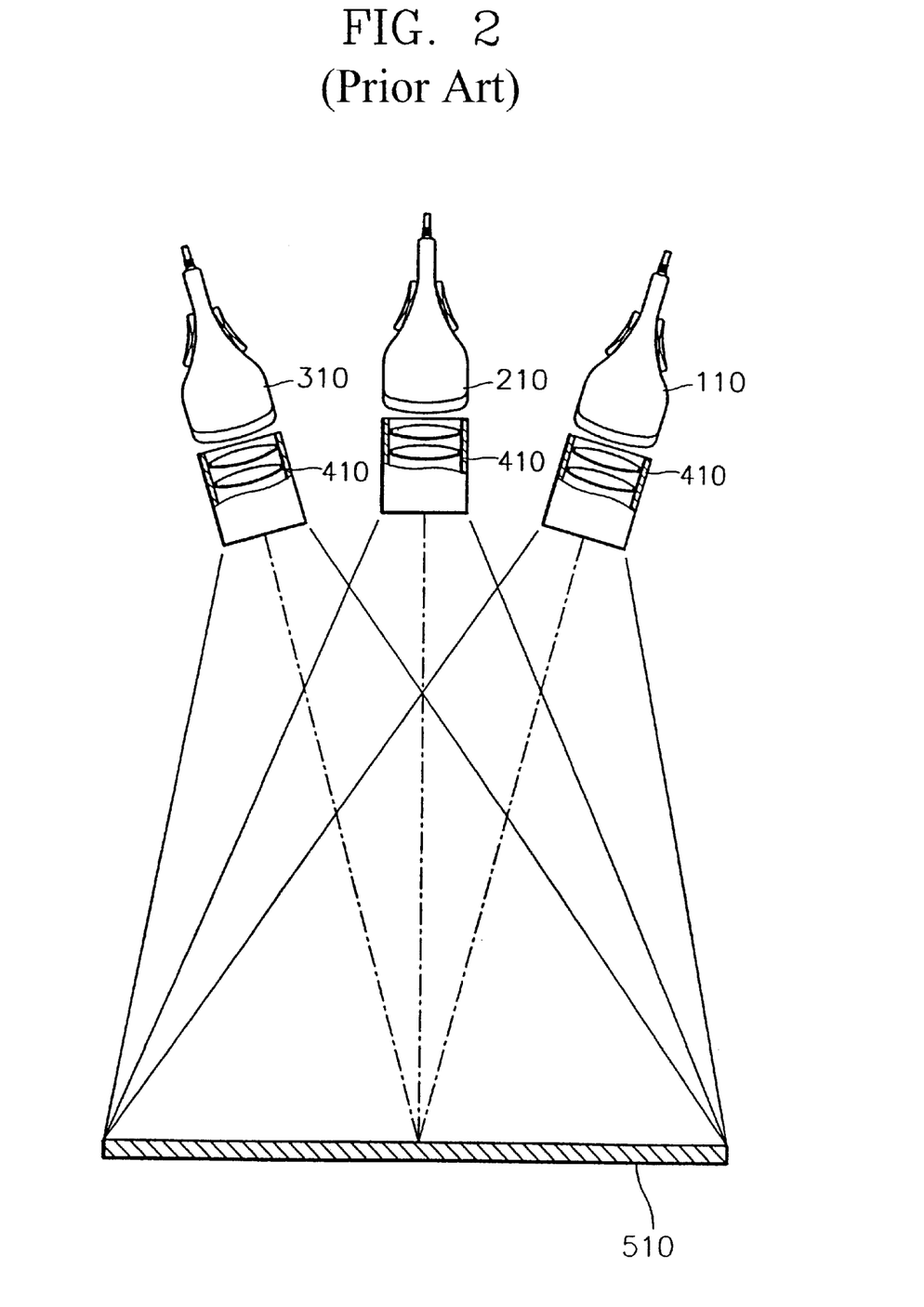
FIG. 2 shows the schematic structure of a conventional cathode ray tube (CRT) projector.

In the case of the three-tube video projector, as shown in FIG. 2, the red, green, and blue pictures irradiated from the respective projection tubes 110, 210, and 310 are combined in a projection screen 510 using an optical instrument 410. The projection tubes 110 and 310 on both sides of the central projection tube 210 for forming the red and blue pictures are fixed by a fixing means (not shown) at a predetermined angle.

The fixing means for fixing the projection tubes 110, 210, and 310 includes a housing member fixed to a setting unit (not shown) of a projector and a bracket (not shown) fixed to the housing member for fixing the projection tubes 110, 210, and 310.

The respective projection tubes 110, 210, and 310 control the convergence with respect to a projection screen by rotating the projection tubes 110 and 310 with respect to the central projection tube 210 at a predetermined angle. The focus lengths of the respective projection tubes are controlled by the driving circuit of the projector.

However, the projection tube assembly of the conventional projector constructed as above has a problem in that the space required for installation is relatively wide since the projection tubes 110, 210, and 310 are arranged more or less linearly and a lens unit is installed in each projection tube.

Also, since the distances between a projection screen 510 and the respective projection tubes 110, 210, and 310 are not uniform in the projection tube assembly, there is a difference in brightness among the pictures formed by the respective projection tubes 110, 210, and 310. Since there are no means for partially collecting light of the picture irradiated from the respective projection tubes to the edge of the screen, the resolution of the picture may be distorted at the edges of the screen.

SUMMARY OF THE INVENTION

To solve the above problem, it is an object of the present invention to provide a portable laser video projector using an optical pumping valve by which it is possible to improve the convergence characteristics and the white balance characteristics of the respective projection tubes, to improve the brightness and the contrast of a projection type display device, and to realize a laser image.

Accordingly, to achieve the above object, there is provided a laser video projector, comprising three optical pumping valves having central optical axes collected at one point, which are arranged to be separated from the point in which the central optical axes are collected by the same distance and a group of three projection lenses respectively installed in front of the three optical pumping valves, for projecting light from the three optical pumping valves.

In the present invention, each of the three optical pumping valves includes a laser resonator for resonating light of a certain wavelength, an optical pumping source for performing pumping so that the laser resonator can generate a laser beam, and an optical valve for filtering the laser beam emitted from the laser resonator so that the filtered laser beam forms a picture.

In the present invention, each of the three optical pumping valves comprises a laser resonator for resonating light of a certain wavelength, an optical pumping source for pumping the laser resonator so that it can emit the laser beam, a reflection type liquid crystal display panel installed to be parallel to the straight path of the laser beam in a place getting out of the way of the straight path as an optical valve for filtering the laser beam so that the filtered laser beam forms a picture, and a dichroic mirror installed on the straight path for reflecting the laser beam emitted from the laser resonator to the reflection type liquid crystal display panel and reflecting the laser beam filtered and reflected from the reflection type liquid crystal display panel to the straight path again.

Also, the laser resonator is preferably formed of a vertical cavity surface emitting laser (VCSEL) diode. In the VCSEL diode, an active layer is preferably formed of a single crystal layer of a Group II–VI or III–V compound semiconductor in the VCSEL diode or of a multi-quantum well layer or a superlattice layer by alternating contacts of different kinds of materials of a Group II–VI or II–V compound in the VCSEL diode. In the VCSEL diode, a mirror forming a cavity in the VCSEL diode is preferably formed of a dichroic mirror formed by the alternating contact of oxide dielectrics respectively having a high refractive index and a low refractive index or of a dispersion Bragg reflector formed the alternating contacts of a Group II–VI and II–V compound semiconductors respectively having a relatively high refractive index and a relatively low refractive index.

Also, the optical pumping source is preferably formed of a gas discharge tube in the pattern of a dot light source or a surface light source. The optical pumping valves are preferably an integrated type, the laser resonator and optical pumping source of which are in direct contact with each other, or a separated type, the laser resonator and the optical pumping source of which are separated.

In order to achieve the above object, there is provided a laser video projector using another optical pumping valve according to the present invention, comprising three optical pumping valves arranged linearly, mirrors installed in front of the two outer optical pumping valves and changing the light path of the outer optical pumping-valves, a color prism installed on the light path of the central optical pumping valve for reflecting the light reflected from the mirrors to proceed along the light path the same as the light path of the central optical pumping valve and directly transmitting the light irradiated from the central optical pumping valve, and at least one projection lens group installed in front of the color prism on the light path of the three optical pumping valves for projecting the light from the three optical pumping valves.

In the present invention, the three optical pumping valves each preferably comprises a laser resonator for resonating light of a certain wavelength, an optical pumping source for pumping the laser resonator so that it can emit a laser beam, and a transmission type liquid crystal display panel as an optical valve for filtering the laser beam so that the filtered laser beam can form a picture. Each of the three optical pumping valves comprises a laser resonator for resonating light of a certain wavelength, an optical pumping source for pumping the laser resonator so that it can emit the laser beam, a reflection type liquid crystal display panel installed to be parallel to a straight path of the laser beam at a location out of the way of the straight path as an optical valve for filtering the laser beam so that the filtered laser beam forms a picture, and a dichroic mirror installed on the straight path for reflecting the laser beam emitted from the laser resonator to the reflection type liquid crystal display panel and reflecting the laser beam filtered and reflected from the reflection type liquid crystal display panel to the straight path again.

Also, in the present invention, the laser resonator is preferably comprised of the VCSEL diode. An active layer is preferably formed of a single crystal layer of a Group II–VI and III–V compound semiconductor or of a multi-quantum well layer or a superlattice layer by alternating contacts of different kinds of materials of a Group II–VI or III–V compound in the VCSEL diode. A mirror forming a cavity in the VCSEL diode is preferably formed of a dichroic mirror formed by the alternation contact of oxide dielectrics respectively having a high relatively refractive index and a low relatively refractive index or of a distributed Bragg reflector formed of alternating contacts of Group II–VI and III–V compound semiconductors respectively having a relatively high refractive index and a relatively low refractive index.

Also, the optical pumping source is preferably comprised of a gas discharge tube in the pattern of a dot light source or a surface light source. In the optical pumping valves, the laser resonator and the optical pumping source are preferably in direct contact with each other or may be a separated type.

Also, in the present invention, the mirrors are preferably formed to be curved in order to prevent the image at the edges from being distorted.

BRIEF DESCRIPTION OF THE DRAWING(S)

The above object and advantages of the present invention will become more apparent by describing in detail a preferred embodiment thereof with reference to the attached drawings in which.

DESCRIPTION OF THE PREFERRED EMBODIMENTS

Hereinafter, a laser video projector using an optical pumping valve according to the present invention will be described in detail with reference to the attached drawings.

Figure 3:
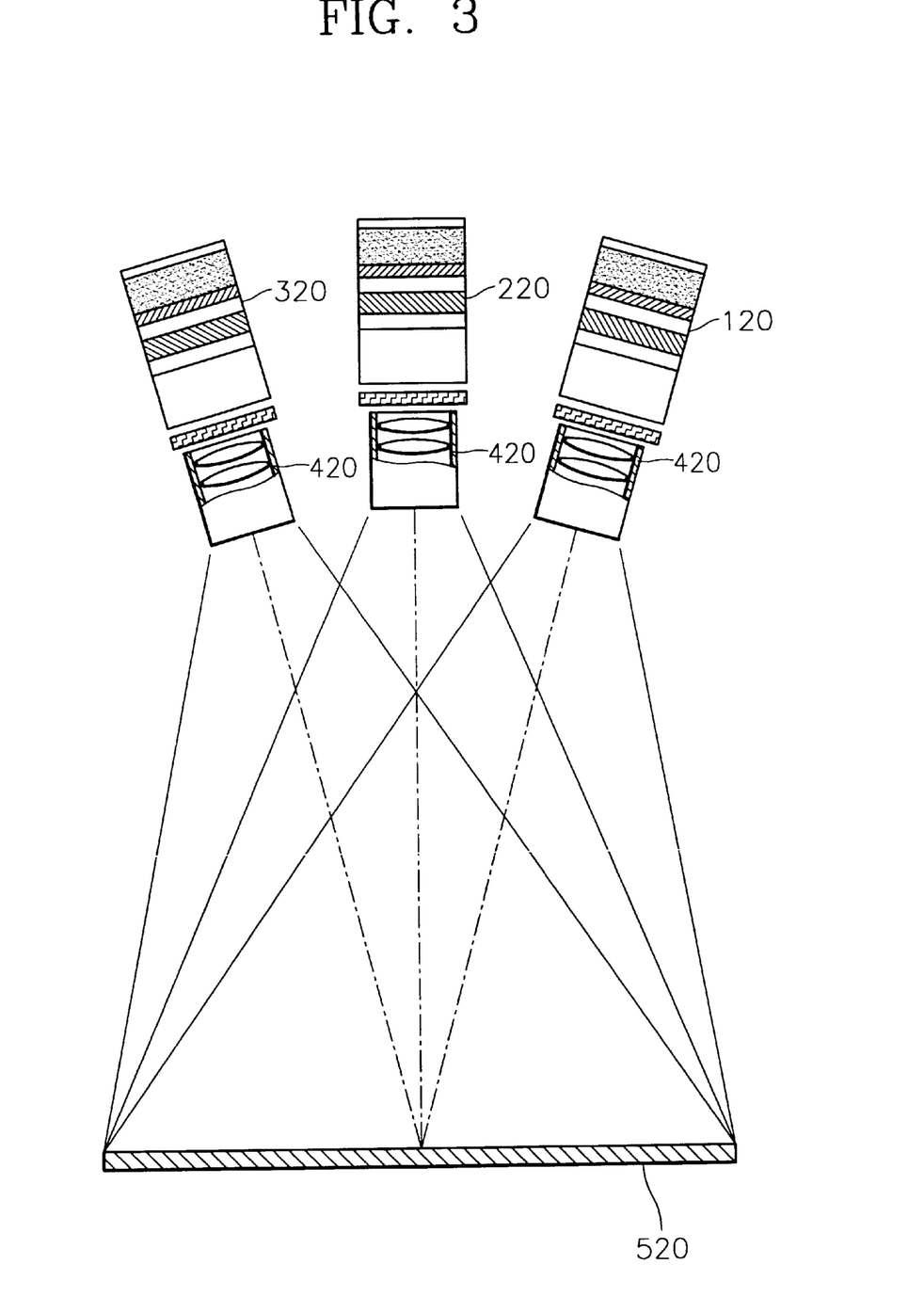
FIG. 3 shows the schematic structure of a first embodiment of a laser video projector using an optical pumping valve according to the present invention.
Figure 4:
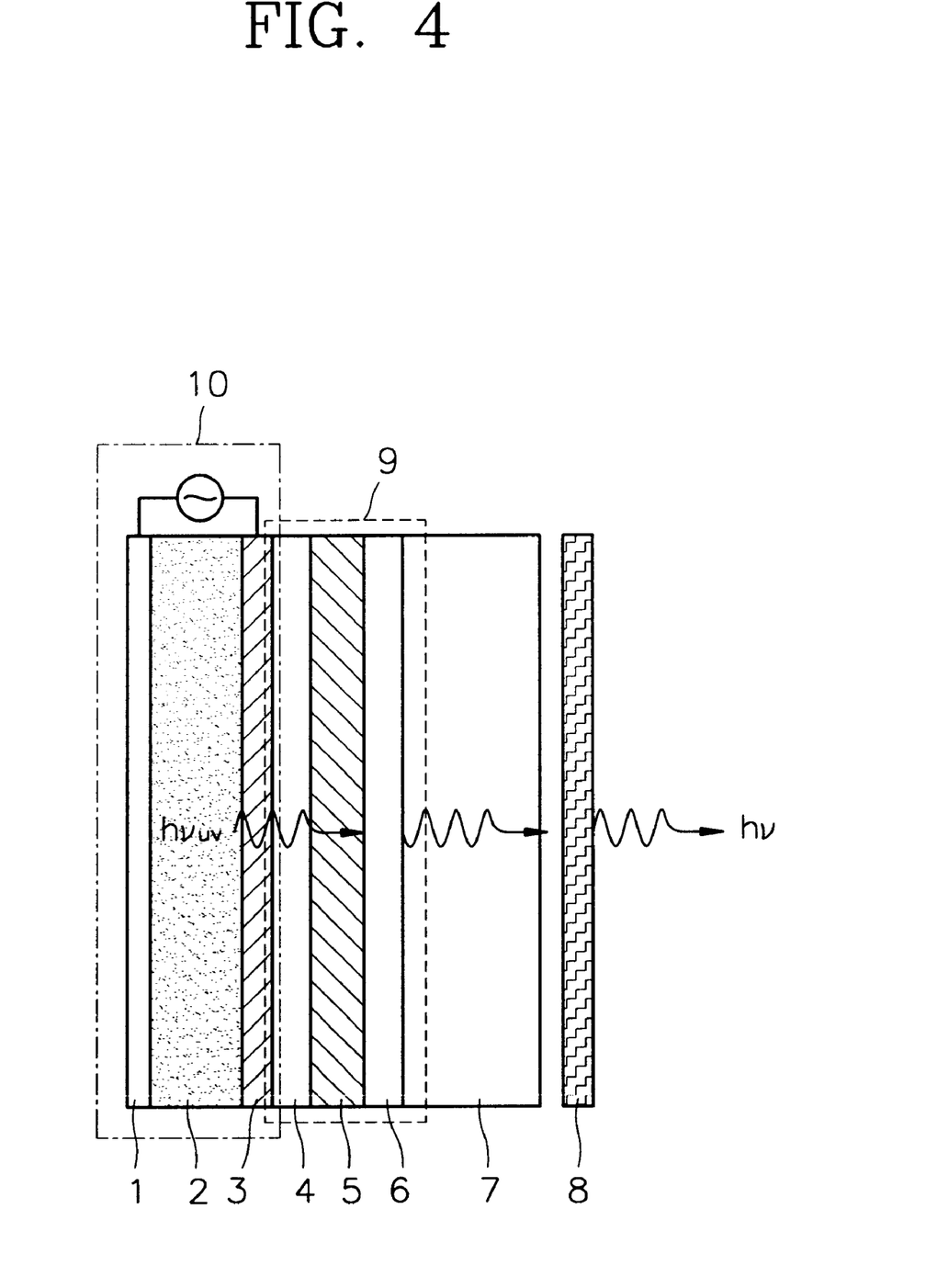
FIG. 4 is a sectional view showing the schematic structure of an integrated type optical pumping valve applied to the video projector of FIG. 3.
Figure 5:
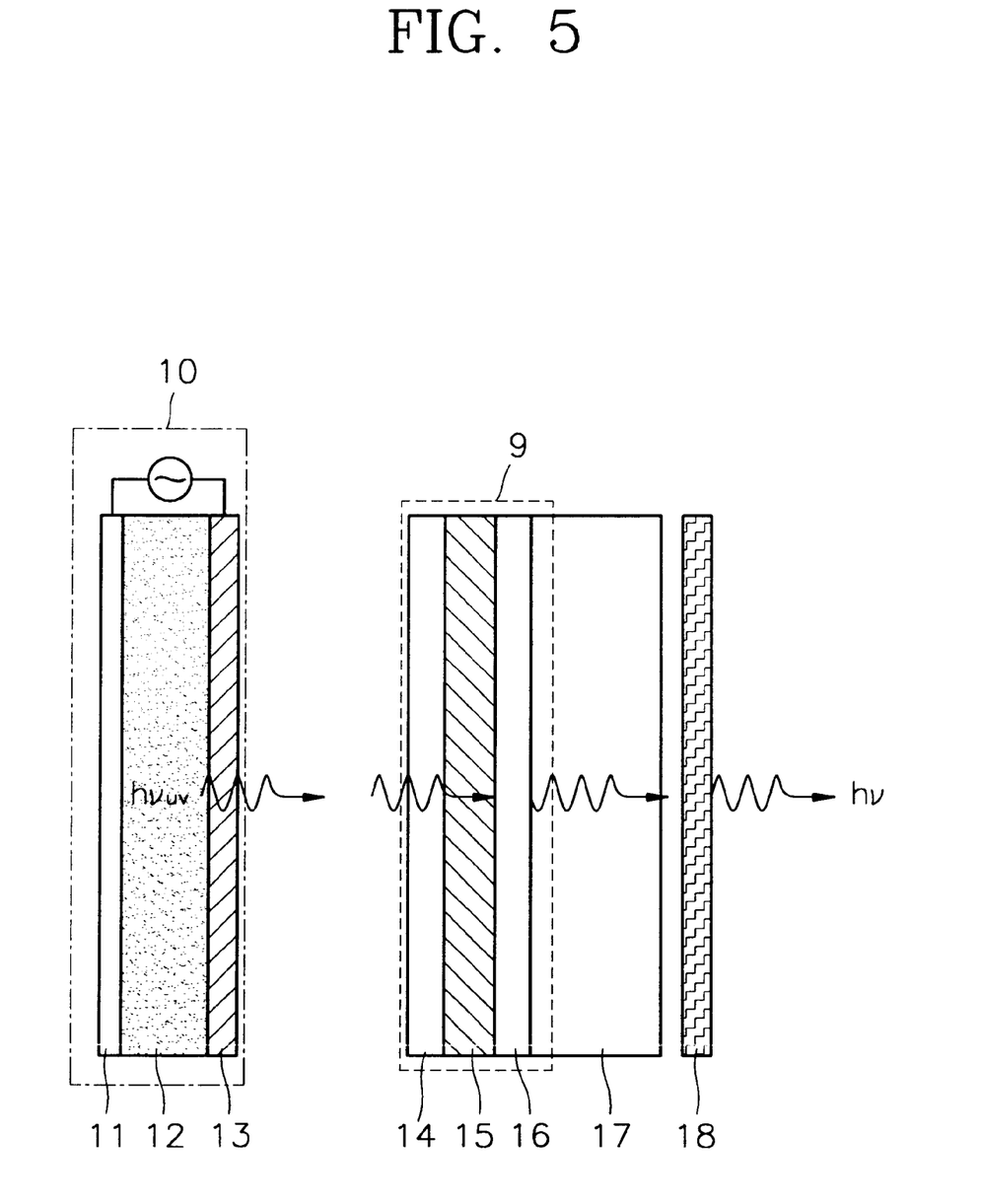
FIG. 5 is a sectional view showing the schematic structure of a separated type optical pumping valve applied to the video projector of FIG. 3.

FIG. 3 shows the schematic structure of a first embodiment of a video projector using an optical pumping valve according the present invention. As shown in FIG. 3, red, green, and blue optical pumping valves 120, 220, and 320 are used instead of cathode ray tubes (CRTs). As shown in FIGS. 4 and 5, the structure of the optical pumping valve may be an integrated type or a separated type.

First, the integrated type optical pumping valve, as shown in FIG. 4, includes a laser resonator, i.e., a cavity 9, a light source for pumping the laser resonator 9, i.e., an optical pumping source 10, and an optical valve 8 for filtering the laser beam emitted from the laser resonator 9 to a video screen. The laser resonator 9 and the optical pumping source 10 are formed to be in contact with each other. The optical pumping source 10 using a glow discharge principle includes a metal reflector 1, an inert gas 2, and a transparent conductive film 3. The laser resonator 9 includes an oxide mirror 4, an active layer, a dispersion Bragg reflector 6, and a transparent substrate 7. An optical valve 8 is formed of a liquid crystal display panel.

Also, the separated type optical pumping valve, as shown in FIG. 5, includes a laser resonator, i.e., a cavity 19, a light source for pumping the laser resonator 19, i.e., an optical pumping source 20, and an optical valve 18 for filtering the laser beam emitted from the laser resonator 19 to the video screen. The laser resonator 19 and the optical pumping source 20 are separated from each other. The optical pumping source 20 includes a metal reflector 11, an inert gas 12, and a transparent conductive film 13. The laser resonator 19 includes an oxide mirror 14, an active layer 15, a dispersion Bragg reflector 16, and a transparent substrate 17. The optical valve 18 is formed of the liquid crystal display panel.

As mentioned above, the structure of the integrated type optical pumping valve is different from that of the separated type optical pumping valve in that the laser resonators 9 and 19 are integrated with the optical pumping sources 10 and 20. Therefore, the integrated type optical pumping valve is shown in FIG. 3 and a drawing of an embodiment to which the separation type optical pumping valve is applied is not shown.

Also, in the optical pumping valve, the laser resonators 9 and 19 are vertical cavity surface emitting laser (VCSEL) diodes which are a Fabry-Perot type of laser. Namely, the VCSEL is comprised of first reflective layers 4 and 14 for transmitting ultraviolet rays and reflecting a visible ray, active layers 5 and 15 which are light emitting sources formed of a semiconductor, second reflective layers 6 and 16 having partial reflectivity for transmitting an emitted laser, and transparent plates 7 and 17 which are supporting plates. The areas of the laser resonators, i.e., cavities are not restricted regardless of the areas of the optical valves 8 and 18.

Figure 6:
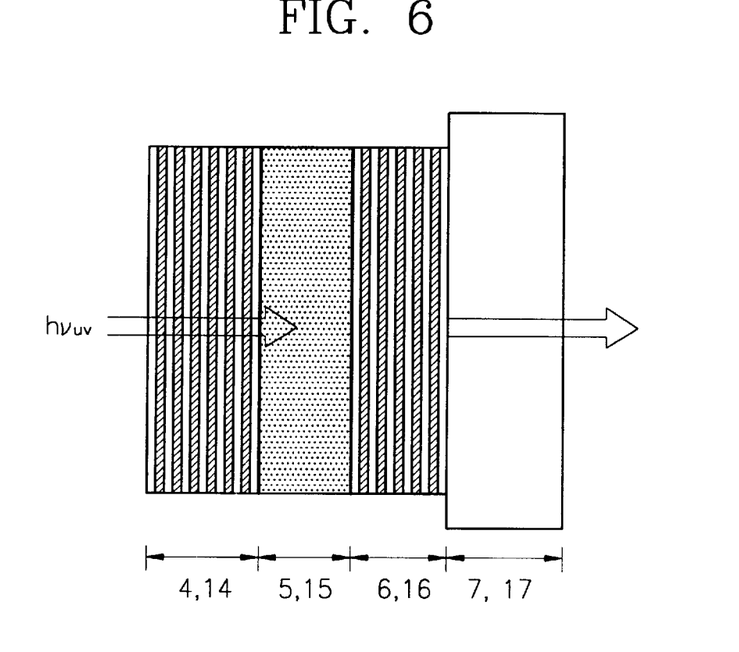
FIG. 6 is a sectional view showing an example in which a laser resonator of the optical pumping valve of FIG. 4 or 5 is formed of single crystal layers.
Figure 7:
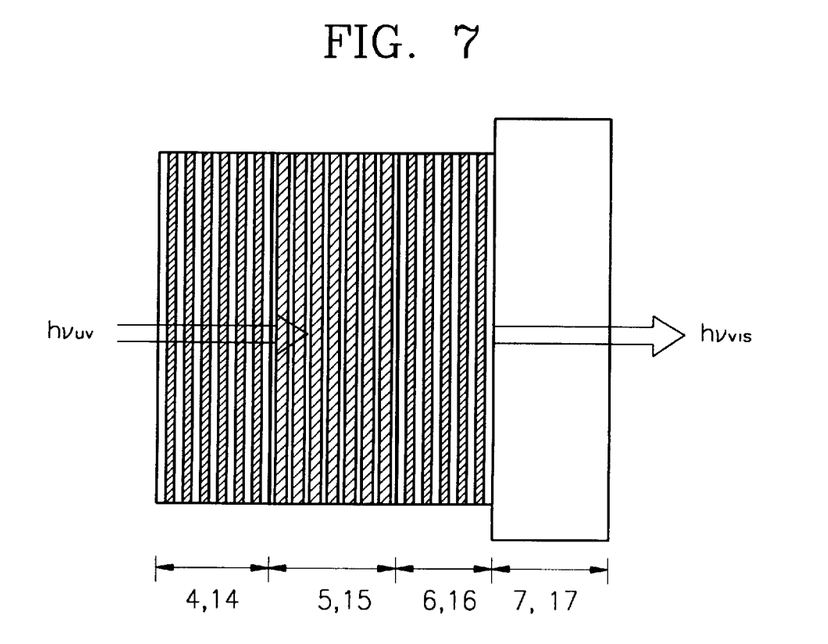
FIG. 7 is a sectional view showing an example in which the laser resonator of the optical pumping valve of FIG. 4 or 5 is formed of a quantum well multi-layer.

Here, the active layers of the laser resonators 9 and 19, as shown in FIG. 6, may be formed of single crystal layers 5 and 15 of a Group II–VI or III–V compound semiconductor. The material used should have an energy band gap suitable for emitting light in the visible spectrum. The materials used are a compound comprising Cd, Zn, Mg, S, and Se and a compound comprising Ga, Al, In, and N. These compounds are controlled to have a binary, ternary, or quaternary pattern of a uniform component ratio so as to have an energy band gap suitable for emitting red, green, and blue visible light. The active layer of the laser resonators 9 and 19, as shown in FIG. 7, are formed to have a multi-quantum well or a superlattice structure 5 and 15 through alternating contacts of different kinds of materials of the Group II–VI or III–V compound semiconductor. The material used should have an energy band gap suitable for emitting light in the visible spectrum. The materials used are a compound comprising Cd, Zn, Mg, S, and Se and a compound comprising Ga, Al, In, and N. These compounds are controlled to have a binary, ternary, or quaternary pattern of a uniform component ratio so as to have the energy band gap suitable for emitting red, green, and blue visible light. The active layers 5 and 15 are formed to have a multi-quantum well or a superlattice structure since it is easy to design the energy band gap so as to form a light emitting transition level suitable for the emission of the red, green, and blue light and to control the component ratio, the thickness, and the layer number of the well and the barrier materials.

Also, in the integrated type and separated type embodiments, the resonator mirrors 4, 14, 6 and 16 for constructing the laser resonators 9 and 19 are formed of a dichroic mirror formed by alternating contacts of oxide dielectrics of a high refractive index and a low refractive index. At this time, the first reflective layers 4 and 14 are formed of a multi-layer structure in which ultraviolet rays are transmitted and visible light is reflected. The ultraviolet ray excites the semiconductor active layers 5 and 15. The visible light generated in the active layers 5 and 15 is reflected so that resonance amplification takes place in the cavity. The reflective index of the second reflective layers 6 and 16 which are partial reflective layers are controlled to be lower than those of the first reflective layers 4 and 14 so that the light amplified by resonance amplification of light generated in the active layer is projected to the outside of the cavity. The second reflective layers 6 and 16 are manufactured to have reflective bands corresponding to the red, green, and blue wavelengths. In another embodiment, the resonator mirrors 4, 14, 6, and 16 may be formed of a dispersion Bragg reflector by alternating contacts of a Group II–VI or III–V compound semiconductor of high and low refractive indices. The resonator mirrors formed of the dispersion Bragg reflector by the alternating contact of materials of high and low refractive indices are formed of a multi-layer thin film using an interference effect in an intersurface. The materials used here are the same as the materials of the active layers, i.e., the compound comprising Cd, Zn, Mg, S, and Se and the compound comprising Ga, Al, In, and N. These compounds are formed to have a binary, a ternary, or a quaternary pattern of a uniform component ratio. The thickness, the component ratio, and the layer number are controlled so as to have a reflective band and a reflective index suitable for the red, green, and blue laser emission of the visible light.

Also, the light source, i.e., the pumping sources 10 and 20 for pumping the laser cavities 9 and 19 in the two optical pumping valves are comprised of an inert gas discharging tube for efficiently emitting light in the ultraviolet region of the spectrum and have a dot light source or a surface light source. The optical valves 8 and 18 for receiving a video signal of the laser beam emitted from the laser cavities 9 and 19 and filters the video signal to the video screen are formed of a transmission type liquid crystal display panel.

As mentioned above, in the first embodiment, it is possible to improve the brightness and the contrast of the video projector and to realize a laser image by arranging optical pumping valves instead of CRTs. Since the optical pumping value is much smaller than the CRT, it is possible to make the projector small and portable.

Figure 8:
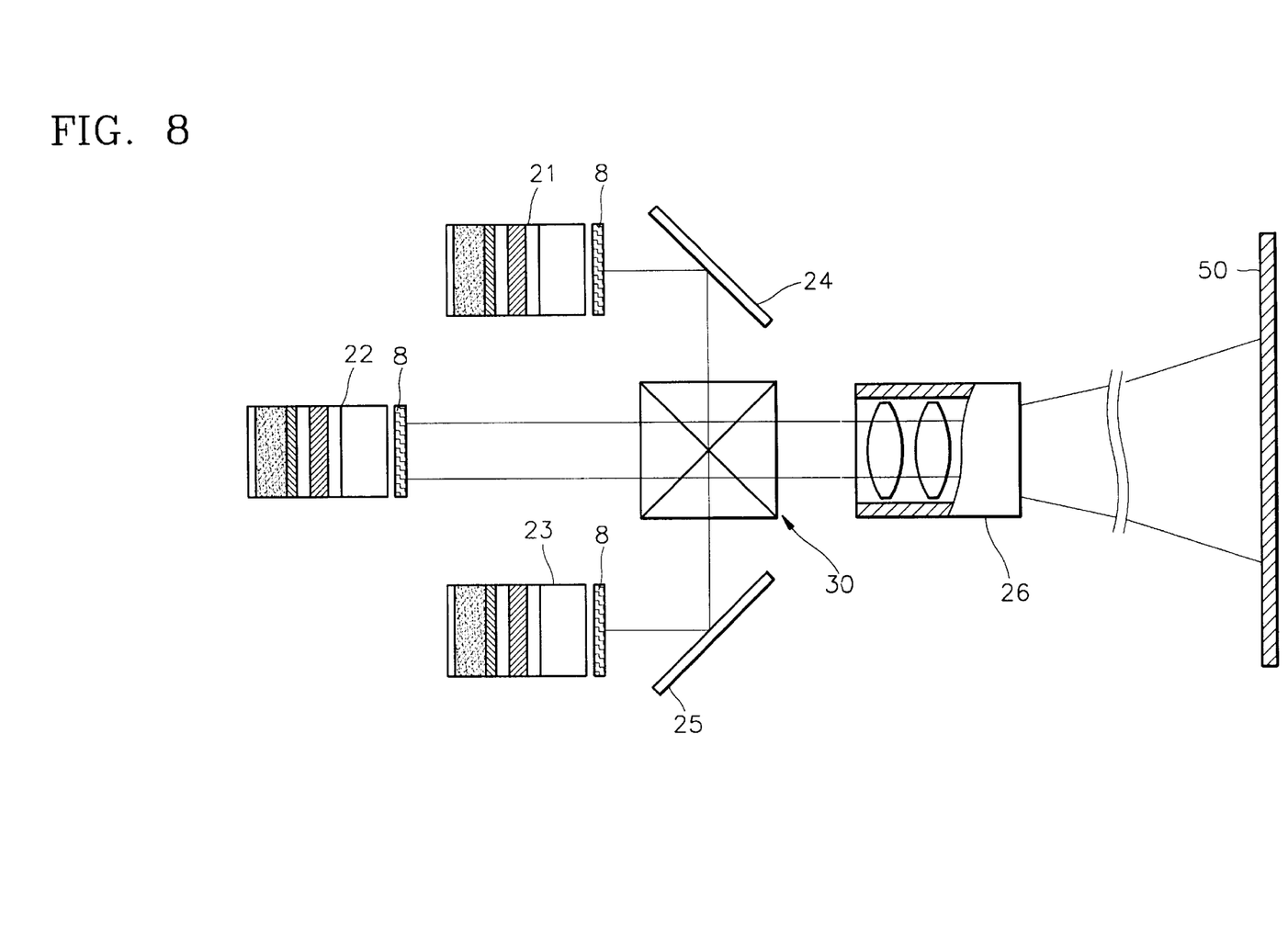
FIG. 8 shows a schematic structure of a second embodiment of a laser video projector using an optical pumping valve according to the present invention.

In the second embodiment, the convergence characteristic and white balance characteristics are improved in the optical projection of each optical pumping valve in addition to the advantages of the first embodiment as shown in FIG. 8.

The video projector of the second embodiment is for forming a color picture by projecting light forming red, blue, and green pictures to a projection screen 50. In the second embodiment, the convergence and white balance characteristics are improved by arranging three optical pumping valves (R, G, and B optical pumping valves) 21, 22, and 23 linearly and coinciding the paths of the light projected from the R and B optical pumping valves 21 and 23 on both sides with the path of the light projected from the central G optical pumping valve 22, thus making light projected to the screen 50 through one path. To do this, there are reflection mirrors 24 and 25 for reflecting the light irradiated from the R and B optical pumping valves 21 and 23 respectively separated from the screen 50 by a predetermined distance to the light path of the central G optical pumping valve 22, a color prism 30 installed on the light path of the central G optical pumping valve 22 located in front of the screen for reflecting the light reflected from the reflection mirrors 24 and 25 to the screen 50 and transmitting the light projected from the G optical pumping valve 22, and a projection lens group 26 installed in front of the color prism 30 and a projection screen (not shown).

Since the R, G, and B optical pumping valves 21, 22, and 23 resonate the laser beam provided from the optical pumping source 10 in the laser resonator 9 and emits light in a specific energy band, R, G, and B laser beams are generated. Here, the optical paths from the screen surface to the projection lens group 40 are preferably formed to have the same length, considering that the lights emitted from the R, G, and B optical pumping valves 21, 22, and 23 are not parallel beam but radiant beam of a negligible degree. To do this, the central G optical pumping valve 22 having a straight light path is preferably arranged to be remote from the screen 50 than the R and B optical pumping valves 21 and 23.

Figure 9:
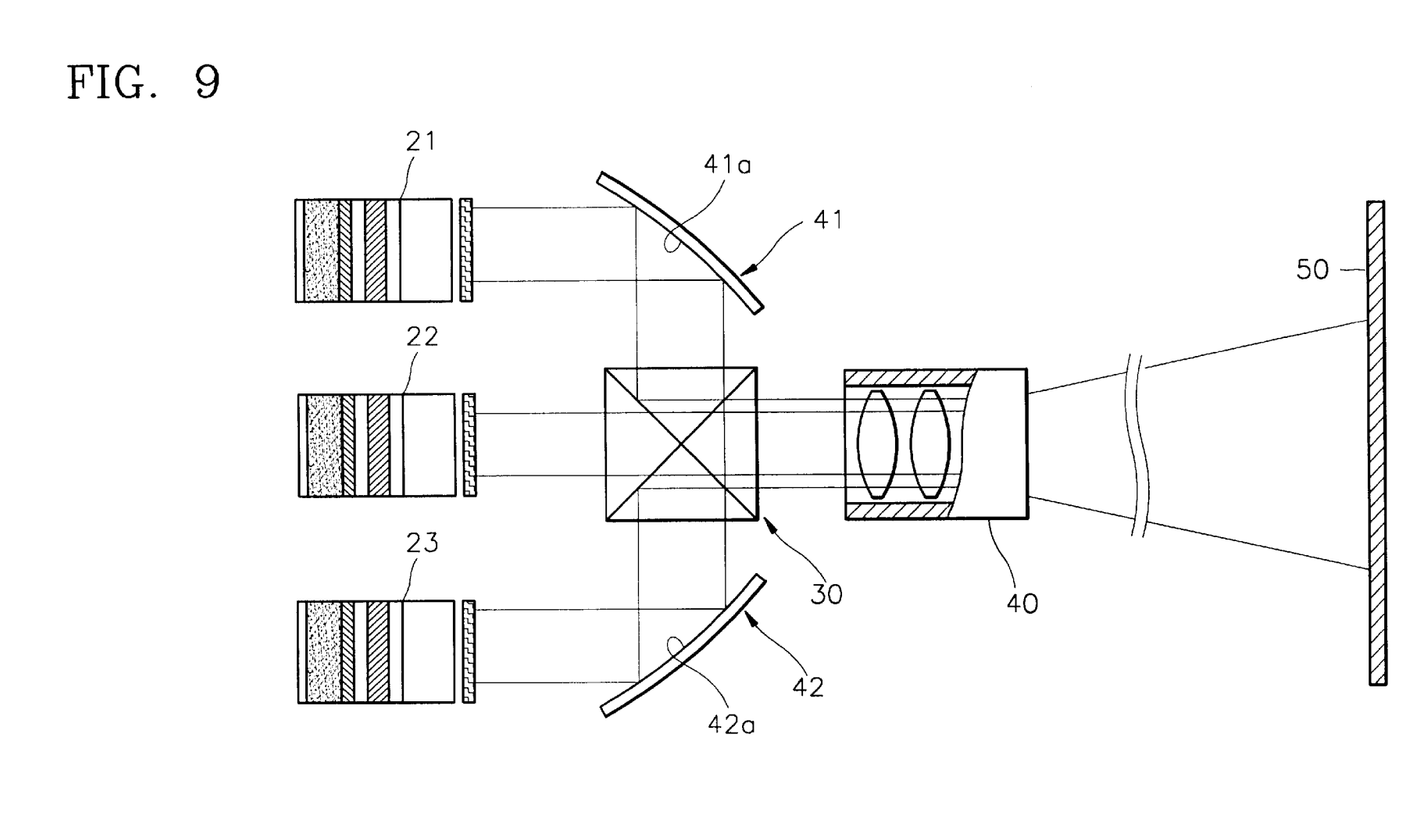
FIG. 9 shows the schematic structure of a third embodiment of a laser video projector using the optical pumping valve according to the present invention.
Figure 10:
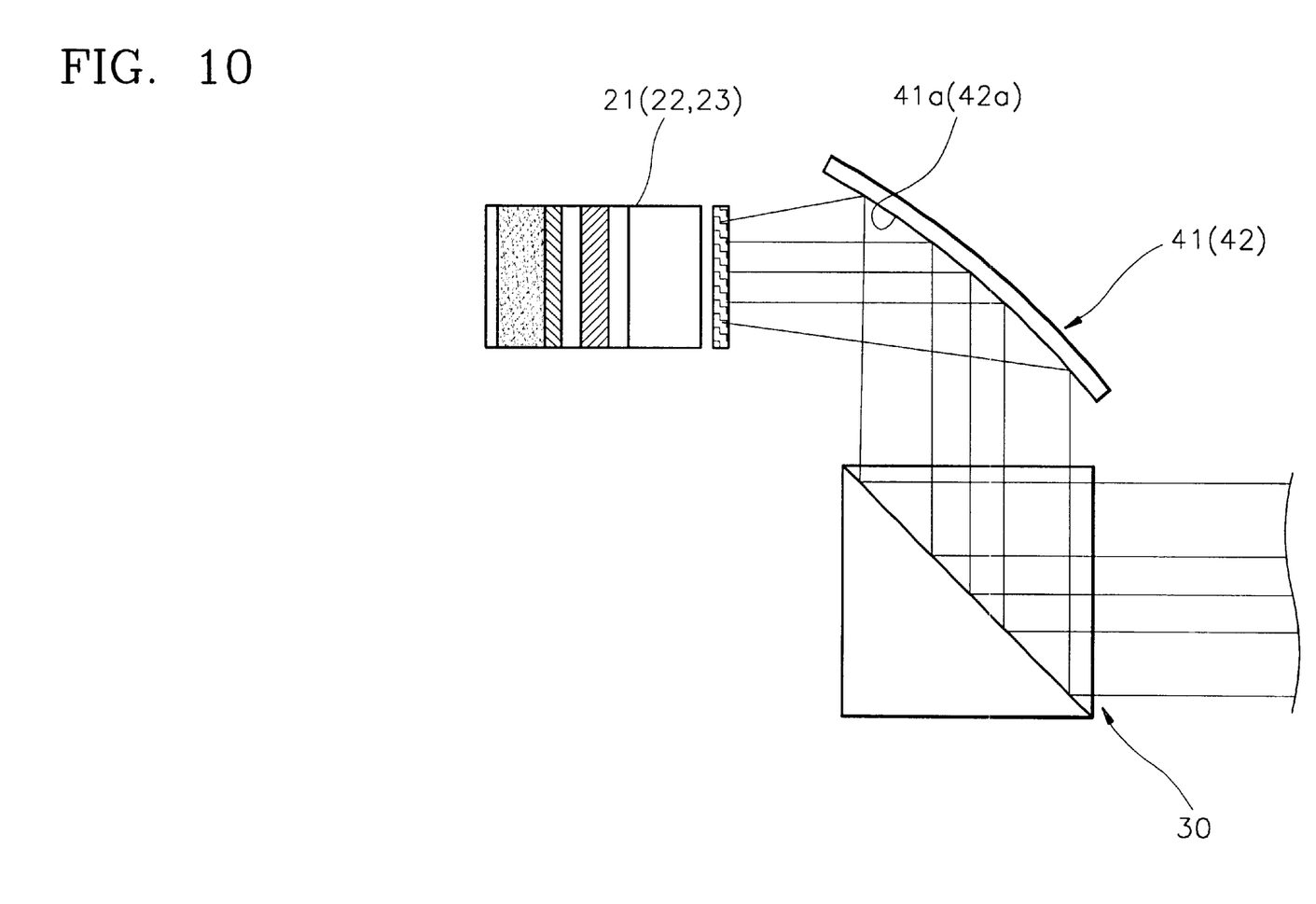
FIG. 10 shows a state in which light is incident on a color prism from a curved mirror in the third embodiment of FIG. 9.

The reflection mirrors 24 and 25 separated from the screen 50 by a predetermined distance in order to change the optical paths of the R and B optical pumping valves 21 and 23 can be formed of curved mirrors 41 and 42 having reflection surfaces 41a and 42a formed to have a predetermined curvature as shown in FIGS. 9 and 10. In the third embodiment, such curved mirrors 41 and 42 are included. In the third embodiment, the curvature of the reflection surfaces 41a and 42b is preferably formed so that the projection light of the picture formed by the optical pumping valve is not diffused but collected at the color prism 30.

In the optical pumping valve assembly of the projector, the lights of the red and blue pictures formed by the R and B optical pumping valves 21 and 23 among the lights formed by the respective optical pumping valves are incident on the projection lens group 40 through the color prism 30. The light of the green picture formed by the central G optical pumping valve passes straight through the color prism 30 and is incident on the projection lens group 40. The lights are collected and diverged by the projection lens group 40 and are scanned to the projection screen 50, thus forming a color picture.

Figure 14:
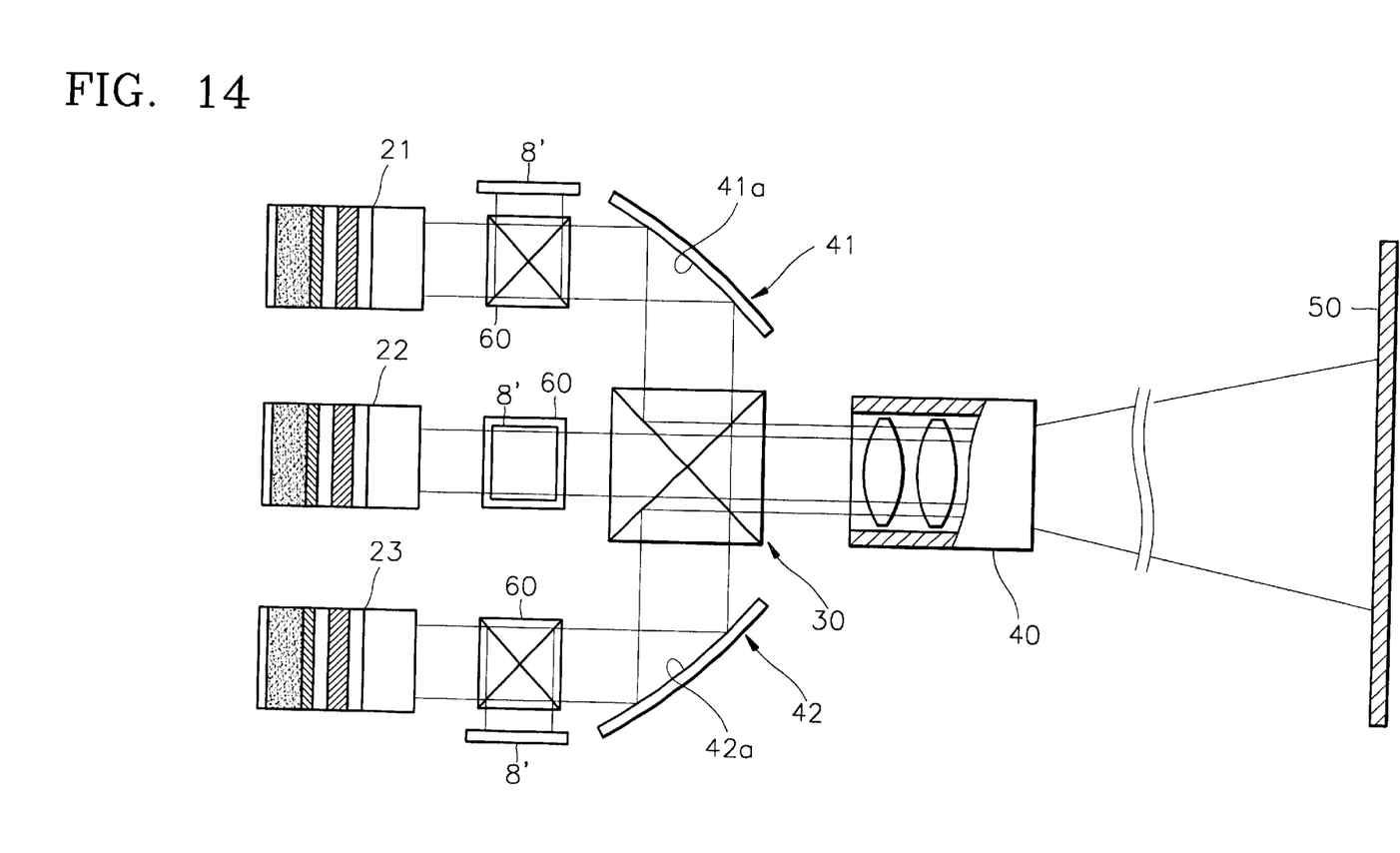
FIG. 14 shows the schematic structure of a sixth embodiment of the laser video projector using the optical pumping valve according to the present invention.

It is possible to prevent the light of the picture projected from the R and B optical pumping valves 21 and 23 during the process of forming the color picture from diffusing by collecting light at the edges of the picture to the center by the reflection mirrors 41 and 42 the reflection surfaces thereof 41a and 42a are formed to be curved, as shown in FIG. 14.

Since the distances of the light paths from the respective screen surface of the R, G, and B optical pumping valves 21, 22, and 23 to the projection lens group are formed to be uniform, it is possible to reduce optical loss due to a difference in distances. The illuminance of the light formed by the respective optical pumping valve and incident on the projection lens group, i.e., the brightness of the picture becomes uniform. Therefore, the white balance characteristic passing through the projection lens group and projected to the projection screen is improved.

Embodiments using the optical pumping valve in which the projection type liquid crystal panel is used as the optical valve were mentioned so far. In FIGS. 11 through 14, embodiments using an optical pumping valve in which a reflection type liquid crystal panel is used as an optical valve will be described in detail.

Figure 11:
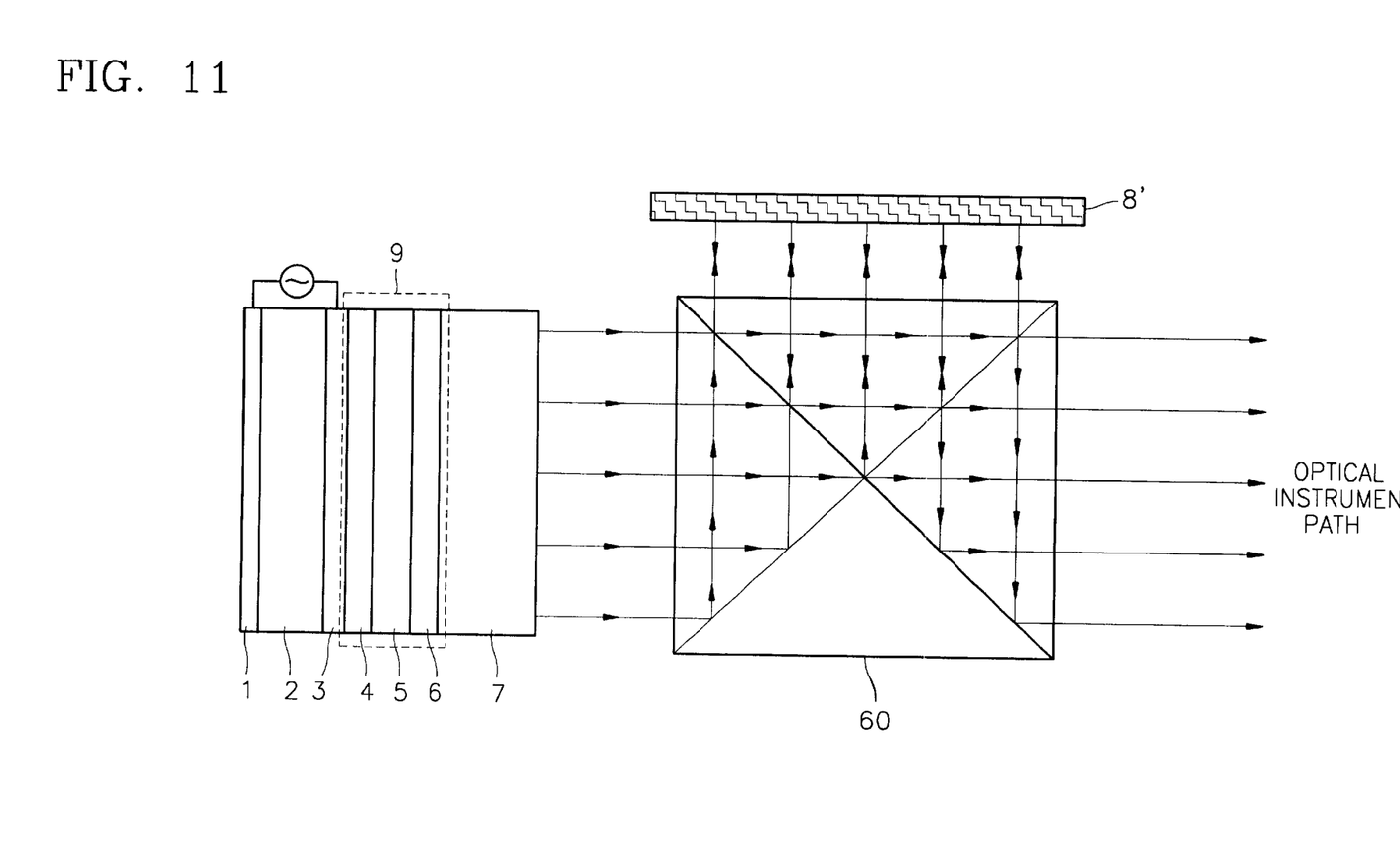
FIG. 11 shows the principle for applying a reflective liquid crystal display panel to the optical pumping valve as an optical valve.

FIG. 11 describes the operation principle of an optical pumping valve using a reflection type liquid crystal panel 8'. As mentioned above, the reflection type liquid crystal panel 8', unlike the transmission type liquid crystal panel, is arranged on a side surface in a direction parallel to the path of the laser beam emitted from the laser resonator 9. A dichroic mirror 60 is arranged on the path of the laser beam. Therefore, the proceeding path of the laser beam emitted from the laser resonator 9 is changed by the dichroic mirror 60. Accordingly, the laser beam is incident on the reflection type liquid crystal panel 8'. The path of the light reflected from the reflection type liquid crystal panel 8' is changed by the dichroic mirror 60. Accordingly, the light proceeds to the projection lens group.

Fourth, fifth, and sixth embodiments are described in the video projector using the optical pumping valve using the reflection type liquid crystal display panel.

Figure 12:
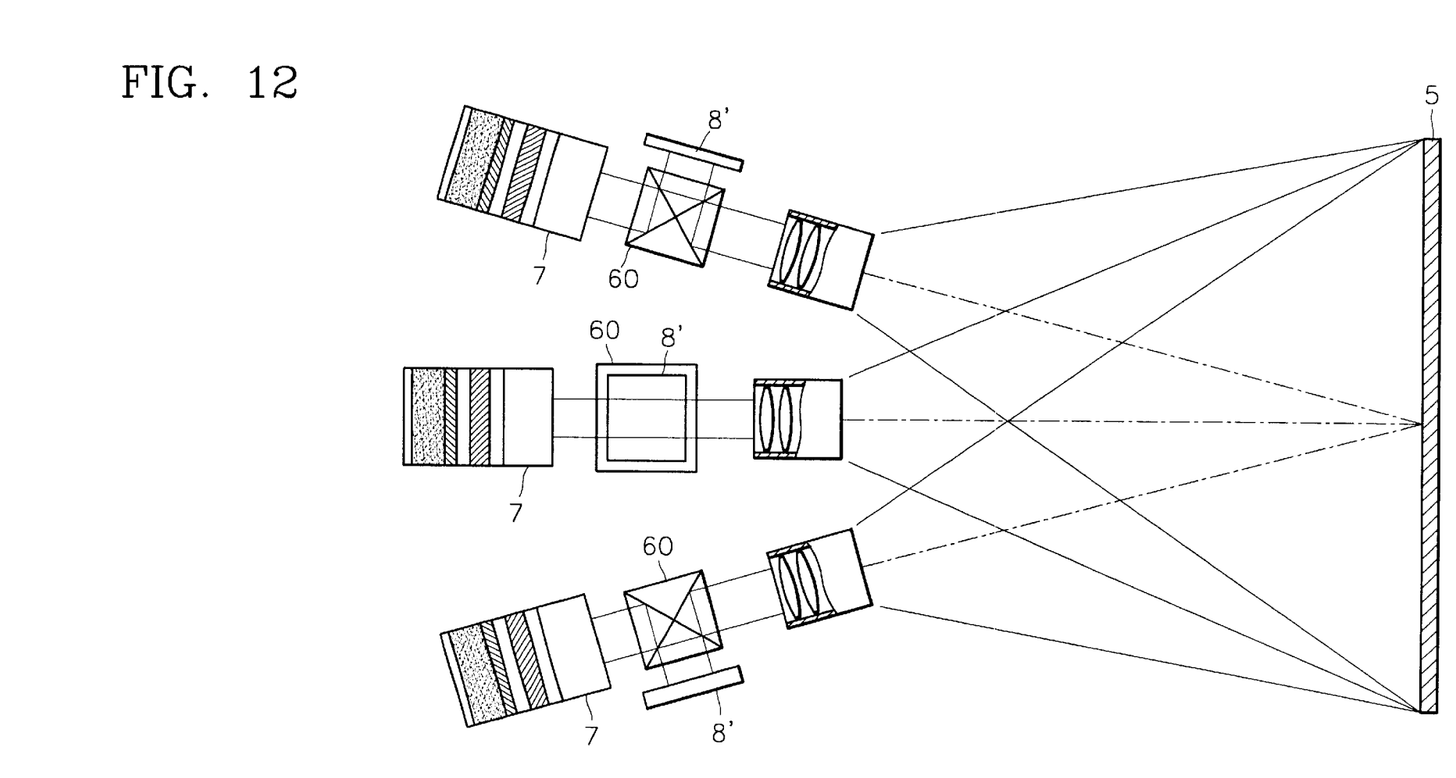
FIG. 12 shows the schematic structure of a fourth embodiment of a laser video projector using the optical pumping valve according to the present invention.

First, the fourth embodiment, as shown in FIG. 12, is different from the first embodiment (refer to FIG. 3) in that the optical pumping valve employing the reflection type liquid crystal display panel 8' is used. Therefore, there is no effect of improving the convergence characteristic and the white balance characteristic as shown in the first embodiment. However, it is possible to make the video projector small and portable.

Figure 13:
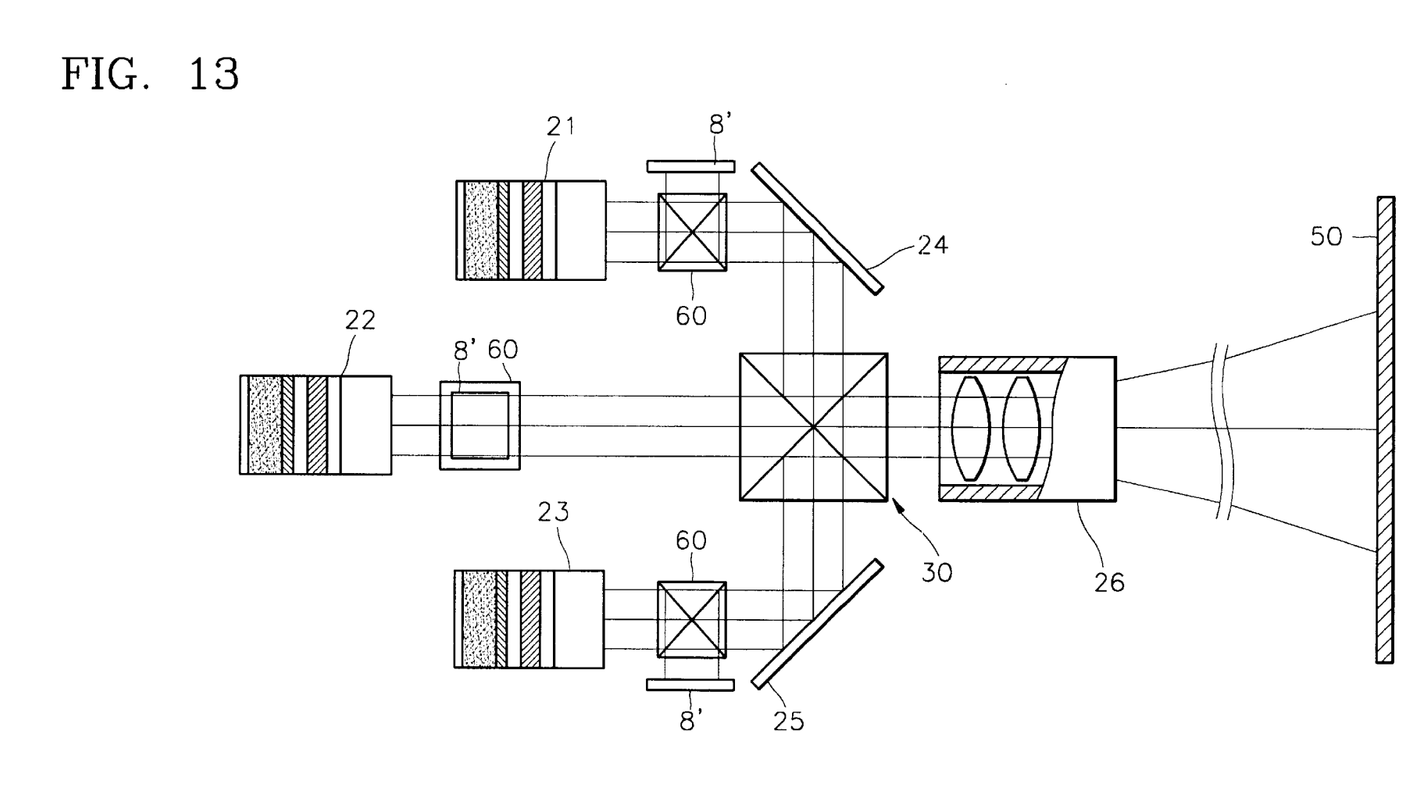
FIG. 13 shows the schematic structure of a fifth embodiment of the laser video projector using the optical pumping valve according to the present invention.

The fifth embodiment, as shown in FIG. 13, is different from the second embodiment (refer to FIG. 8) in the optical pumping valve using the reflection type liquid crystal display panel 8' and the dichroic mirror 60 instead of the transmission type liquid crystal display panel is used. Therefore, it is possible to improve the convergence characteristic and the white balance characteristic as shown in the second embodiment and to make the video projector small and portable, unlike the video projector using CRTs.

The sixth embodiment, as shown in FIG. 14, is different from the third embodiment (refer to FIG. 9) in that the optical pumping valve employing the reflection type liquid crystal display panel 8' and the dichroic mirror 60 is used instead of the transmission type liquid crystal display panel. Therefore, it is possible to improve the convergence characteristic and the white balance characteristic as shown in the third embodiment and to make the video projector small and portable.

Since the dichroic mirror 60 is used more often than the first, second, and third embodiments using the optical pumping valve employing the transmission type liquid crystal display panel in the fourth, fifth, and sixth embodiments, it is disadvantageous in respect to size. However, it has an advantage in that the reflection type liquid crystal display panel can be used as the optical valve.

In the above embodiment, any type of optical pumping value between the integrated type and the separated type can be used. Any type of liquid crystal display panel, i.e., the transmission type liquid crystal display panel and the reflection type liquid crystal display panel can be used as the optical valve.

As mentioned above, the video projector using the optical pumping valve according to the present invention has the following advantages by forming an image using the optical pumping valve including a laser resonator for resonating light having a certain wavelength, an optical pumping source for pumping the laser resonance so that it can emit a laser beam, and an optical valve for filtering the laser beam emitted from the laser resonator forms a picture at the video screen instead of the CRT.

1. All embodiments according to the present invention employ a surface emitting laser which has a small distributed angle and which proceeds straightly, and they have less optical loss. Accordingly, the brightness of the screen is improved.

2. All embodiments according to the present invention have better contrast than the video projector using the conventional CRT has since the laser beam is directly projected to the screen.

3. All embodiments according to the present invention consume less power since their laser resonator have a high emission effect and a less optical loss.

4. All embodiments according to the present invention are portable since simple and less voluminous materials and parts are used.

5. Embodiments according to the present invention shows it is possible to realize a new image culture by laser.

6. Embodiments according to the present invention shows it is possible to realize a laser device by a new pumping method.

7. In the second, third, fifth, and sixth embodiments, since the light is collected and diverged by only one projection lens group and is projected to the projection screen, the convergence characteristic is improved. Furthermore, in the case of the third and sixth embodiments, it is possible to prevent the light at the edge from diffusing in a picture formed by the optical pumping valve.

The present invention is not restricted to the above embodiments, and it is clearly understood that many variations are possible within the scope and spirit of the present invention by anyone skilled in the art.

What is claimed is:

1. A laser video projector, comprising:
   three optical pumping valves arranged in line;
   mirrors installed downstream of the two outer optical pumping valves for reflecting light beams generated by the outer optical pumping valves towards an optical path of a light beam generated by the central optical pumping valve;
   a color prism installed downstream of the central optical pumping valve and on said optical path for directly transmitting the light beam of the central optical pumping valve and for reflecting the light beams reflected from the mirrors to travel along said optical path; and
   at least one projection lens group installed downstream of the color prism on said optical path for projecting the light beams from the three optical pumping valves onto a screen;
   wherein the mirrors are curved mirrors for preventing edges of an image formed by the light beams from being distorted.

2. The laser video projector of claim 1, wherein each of the three optical pumping valves comprises:
   a laser resonator for resonating light of a certain wavelength;
   an optical pumping source for pumping the laser resonator so as to emit a laser beam; and
   an optical valve for filtering the laser beam in accordance with an image signal.

3. The laser video projector of claim 1, wherein each of the three optical pumping valves comprises:
   a laser resonator for resonating light of a certain wavelength;
   an optical pumping source for pumping the laser resonator so as to emit a laser beam;
   a reflection-type liquid crystal display panel installed in parallel with and beside a straight travelling path of the laser beam, said reflection-type liquid crystal display panel is configured to function as an optical valve for filtering the laser beam in accordance with an image signal; and
   a dichroic mirror installed on the straight travelling path of the laser beam for reflecting the laser beam towards the reflection-type liquid crystal display panel and for reflecting the laser beam, filtered and reflected from the reflection-type liquid crystal display panel, back to the straight travelling path.

4. The video projector of claim 2, wherein the laser resonator comprises a VCSEL diode.

5. The laser video projector of claim 4, wherein the VCSEL diode comprises an active layer formed of a single crystal layer of a Group II–VI or III–V compound semiconductor.

6. The laser video projector of claim 4, wherein the VCSEL diode comprises an active layer formed of a multi-quantum well layer or a super-lattice layer comprising alternating contacting layers of different kinds of materials of a Group II–VI or III–V compound.

7. The laser video projector of claim 4, further comprising a dichroic mirror forming a cavity in the VCSEL diode and including alternating contacting layer s of oxide dielectrics respectively having a relatively high refractive index and a relatively low refractive index.

8. The laser video projector of claim 4, further comprising a distributed Bragg reflector forming a cavity in the VCSEL diode and including alternating contacting layers of Group II–VI and III–V compound semiconductors respectively having a relatively high refractive index and a relatively low refractive index.

9. The laser video projector of claim 2, wherein the optical pumping source comprises a gas discharge tube.

10. The laser video projector of claim 2, wherein the optical pumping source is configured to have a dot light source pattern or a surface light source pattern.

11. The laser video projector of claim 2, wherein the optical valve comprises a transmission-type liquid crystal display panel.

12. The laser video projector of claim 2, wherein the optical pumping valves are of an integrated type with the respective laser resonator and optical pumping source being in direct contact with each other.

13. The laser video projector of claim 2, wherein the optical pumping valves are of a separated type with the respective laser resonator and optical pumping source being separated.

14. A laser video projector, comprising:
   at least first and second optical pumping valves for generating first and second light beams along first and second straight light paths, respectively;
   a curved mirror installed downstream of the second optical pumping valves and on the second light path for reflecting the second light beam toward the first light path;
   a prism installed downstream of the first optical pumping valve and on the first light path for transmitting the first light beam and for reflecting the second light beam reflected from the mirror so that the second light beam continues to travel along the first light path; and
   at least one projection lens installed downstream of the prism on the first light path for projecting the first and second light beams onto a screen;
   wherein the curved mirror has a predetermined curvature for preventing edges of an image formed by the first and second light beams from being distorted.

15. The laser video projector of claim 14, further comprising:
   a third optical pumping valve for generating a third light beam along a third straight light path;
   another curved mirror installed downstream of the third optical pumping valve and on the third light path for reflecting the third light beam toward the first light path;
   wherein
      said prism is installed to reflect the third light beam reflected from said another mirror so that the third light beam continues to travel along the first light path and is projected by said at least one projection lens, together with the first and second light beams, onto the screen; and said another curved mirror has a predetermined curvature for preventing edges of the image formed by the first, second and third light beams from being distorted.

16. The laser video projector of claim 14, wherein the first and second optical pumping valves are substantially equally spaced from a projection plane of said projection lens.

17. The laser video projector of claim 14, wherein each of the first and second optical pumping valves comprises:
a laser resonator for resonating light of a certain wavelength;
an optical pumping source for pumping the laser resonator so as to emit a laser beam; and
an optical valve for filtering the laser beam in accordance with an image signal.

18. The laser video projector of claim 14, wherein each of the first and second optical pumping valves comprises:
a laser resonator for resonating light of a certain wavelength;
an optical pumping source for pumping the laser resonator so as to emit a laser beam;
a reflection-type liquid crystal display panel installed in parallel with and beside a straight travelling path of the laser beam, said reflection-type liquid crystal display panel is configured to function as an optical valve for filtering the laser beam in accordance with an image signal; and
a dichroic mirror installed on the straight travelling path of the laser beam for reflecting the laser beam towards the reflection-type liquid crystal display panel and for reflecting the laser beam, filtered and reflected from the reflection-type liquid crystal display panel, back to the straight travelling path.

19. The video projector of claim 17, wherein the laser resonator comprises a VCSEL diode.

20. The laser video projector of claim 19, wherein the VCSEL diode comprises an active layer formed of a single crystal layer of a Group II–VI or III–V compound semiconductor.

21. The laser video projector of claim 19, wherein the VCSEL diode comprises an active layer formed of a multi-quantum well layer or a super-lattice layer comprising alternating contacting layers of different kinds of materials of a Group II–VI or III–V compound.

22. The laser video projector of claim 19, further comprising a dichroic mirror forming a cavity in the VCSEL diode and including alternating contacting layers of oxide dielectrics respectively having a relatively high refractive index and a relatively low refractive index.

23. The laser video projector of claim 19, further comprising a distributed Bragg reflector forming a cavity in the VCSEL diode and including alternating contacting layers of Group II–VI and III–V compound semiconductors respectively having a relatively high refractive index and a relatively low refractive index.

24. The laser video projector of claim 17, wherein the optical pumping source comprises a gas discharge tube.

25. The laser video projector of claim 17, wherein the optical pumping source is configured to have a dot light source pattern or a surface light source pattern.

26. The laser video projector of claim 17, wherein the optical valve comprises a transmission-type liquid crystal display panel.

27. The laser video projector of claim 17, wherein the optical pumping valves are of an integrated type with the respective laser resonator and optical pumping source being in direct contact with each other.

28. The laser video projector of claim 17, wherein the optical pumping valves are of a separated type with the respective laser resonator and optical pumping source being separated.

* * * * *